United States Patent
Blumenthal

(10) Patent No.: US 10,593,239 B2
(45) Date of Patent: Mar. 17, 2020

(54) SYSTEM AND METHOD FOR THE INSTALLATION OF GROUND-BASED ADVERTISING UNITS

(71) Applicant: Benjamin Elias Blumenthal, Dallas, TX (US)

(72) Inventor: Benjamin Elias Blumenthal, Dallas, TX (US)

(*) Notice: Subject to any disclaimer, the term of this patent is extended or adjusted under 35 U.S.C. 154(b) by 0 days.

(21) Appl. No.: 16/215,118

(22) Filed: Dec. 10, 2018

(65) Prior Publication Data
US 2019/0287441 A1 Sep. 19, 2019

Related U.S. Application Data

(63) Continuation-in-part of application No. 15/922,621, filed on Mar. 15, 2018.

(51) Int. Cl.
 *G09F 19/22* (2006.01)
 *G06Q 30/02* (2012.01)
 *G09F 27/00* (2006.01)
 *G09F 13/00* (2006.01)

(52) U.S. Cl.
 CPC ....... *G09F 19/228* (2013.01); *G06Q 30/0267* (2013.01); *G09F 27/007* (2013.01); *G09F 13/00* (2013.01)

(58) Field of Classification Search
 CPC .............................. G09F 19/228; G09F 3/201
 See application file for complete search history.

(56) References Cited

U.S. PATENT DOCUMENTS

| | | | | |
|---|---|---|---|---|
| 1,754,851 A * | 4/1930 | Dey | .......................... | G09F 13/20 40/653 |
| 2,920,184 A * | 1/1960 | Kessler | .................... | E01F 9/547 362/152 |
| 4,730,146 A * | 3/1988 | Maser | .................... | H05B 33/08 313/511 |
| 4,907,361 A * | 3/1990 | Villard | .................... | G09F 19/22 362/153 |
| 5,263,804 A * | 11/1993 | Ernst | .................... | F16B 13/141 405/259.5 |
| 5,483,781 A * | 1/1996 | Ernst | .................... | F16B 13/141 405/259.5 |
| 5,772,357 A * | 6/1998 | Evans | .................... | E01F 13/105 256/13.1 |

(Continued)

FOREIGN PATENT DOCUMENTS

WO   WO02/075704 A1   9/2002

OTHER PUBLICATIONS

Spot on Ads webpage, http://www.spotonads.com/products, 2014, 3 pages.

(Continued)

*Primary Examiner* — Gary C Hoge
(74) *Attorney, Agent, or Firm* — Standley Law Group LLP; Jeffrey S. Standley; Adam J. Smith

(57) ABSTRACT

A system and method for installing a ground-based advertising unit is provided. The ground-based advertising unit comprises an aperture for accepting a fastener. A hole is drilled into a surface. An adhesive is applied to the hole. An anchor which is configured to mate with the fastener is inserted into the hole. The adhesive is cured. The fastener is inserted through the aperture. The fastener is mated with the anchor.

15 Claims, 12 Drawing Sheets

(56) References Cited

U.S. PATENT DOCUMENTS

| | | | | |
|---|---|---|---|---|
| 5,848,830 A * | 12/1998 | Castle | ............... | A47G 27/0243 362/84 |
| 6,481,921 B1 * | 11/2002 | Fenimore | ............... | G09F 19/22 404/7 |
| 6,692,182 B1 * | 2/2004 | Fenimore | ............. | E01F 15/083 404/7 |
| 7,351,003 B1 * | 4/2008 | Fenimore | ............. | E01F 15/085 40/565 |
| 7,845,611 B1 * | 12/2010 | Sholander | ................ | B42D 9/04 248/441.1 |
| 8,250,795 B2 | 8/2012 | Barbieri et al. | | |
| 2003/0099105 A1 * | 5/2003 | Watson | ................... | F21S 9/037 362/241 |
| 2003/0147694 A1 * | 8/2003 | Ryman | ................... | G09F 19/22 404/71 |
| 2004/0055483 A1 | 3/2004 | Thollin | | |
| 2005/0229451 A1 * | 10/2005 | Mullens | ................. | G09F 11/02 40/500 |
| 2006/0239775 A1 * | 10/2006 | Klassen | ................ | G09F 19/22 404/7 |
| 2007/0222633 A1 | 9/2007 | Blum et al. | | |
| 2008/0005947 A1 | 1/2008 | Barna et al. | | |
| 2009/0282716 A1 * | 11/2009 | Barbieri | ................. | G09F 7/002 40/606.01 |
| 2010/0153311 A1 * | 6/2010 | McCormick | ........... | G06Q 99/00 705/500 |
| 2013/0132810 A1 * | 5/2013 | Jandt | ....................... | G09F 13/22 715/209 |
| 2014/0020273 A1 | 1/2014 | DeMarco | | |
| 2014/0059902 A1 * | 3/2014 | Brown | .................. | B42D 5/043 40/497 |
| 2015/0096209 A1 | 4/2015 | Biehl et al. | | |
| 2015/0101222 A1 * | 4/2015 | Hochfelsen | ............. | G09F 7/002 40/541 |
| 2016/0227897 A1 * | 8/2016 | Jobling | ................. | G09F 3/0291 |
| 2016/0238052 A1 * | 8/2016 | Schaeffer | ............. | F16B 13/065 |
| 2017/0055138 A1 * | 2/2017 | McDonnell | ........... | H04W 4/021 |
| 2018/0082612 A1 * | 3/2018 | McDade | ................ | G09F 3/204 |
| 2018/0092482 A1 * | 4/2018 | Lock | ....................... | A47G 25/82 |
| 2018/0108051 A1 * | 4/2018 | Rygiel | ............... | G06Q 30/0276 |

OTHER PUBLICATIONS

Appellstriping, Youtube Video of Parking lot advertising, https://www.youtube.com/watch?v=tRE4DR5lhhY, Nov. 9, 2018, 2 pages.

* cited by examiner

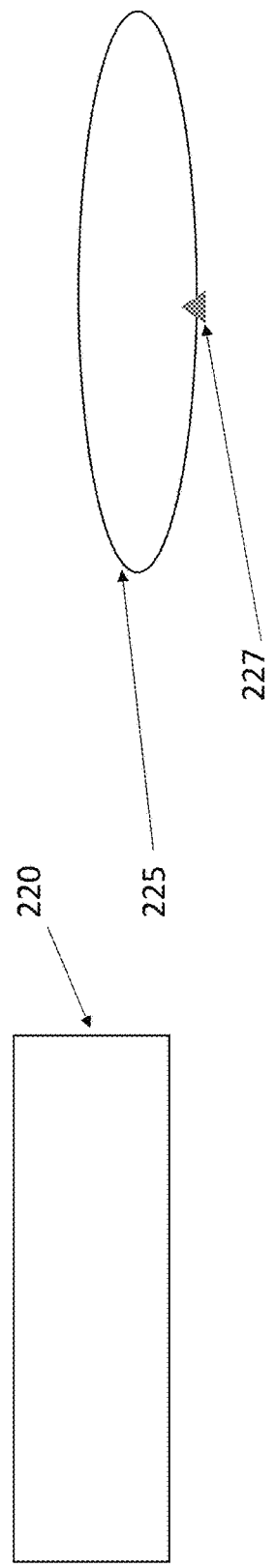
FIGURE 2B
FIGURE 2D
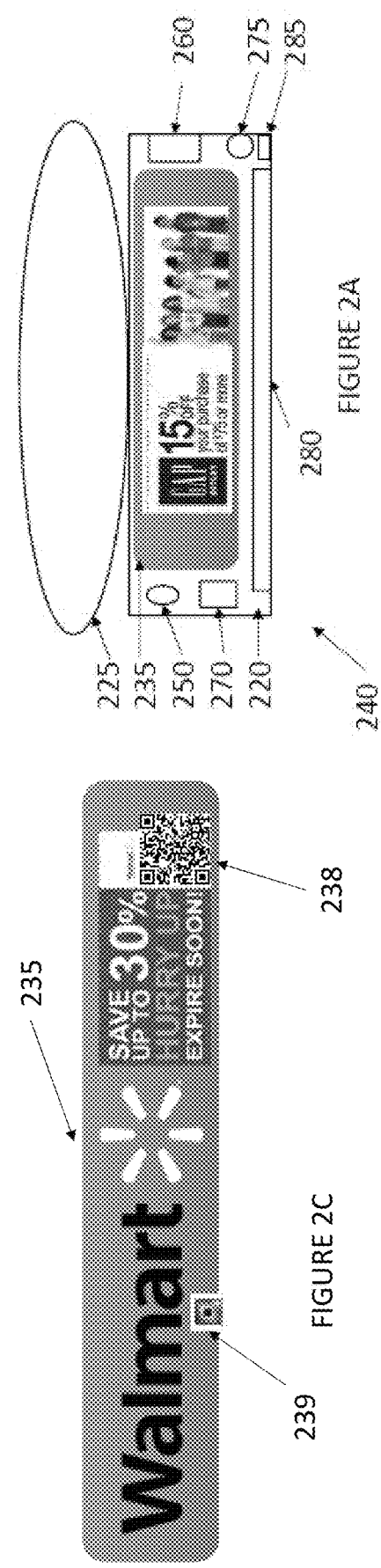
FIGURE 2A
FIGURE 2C

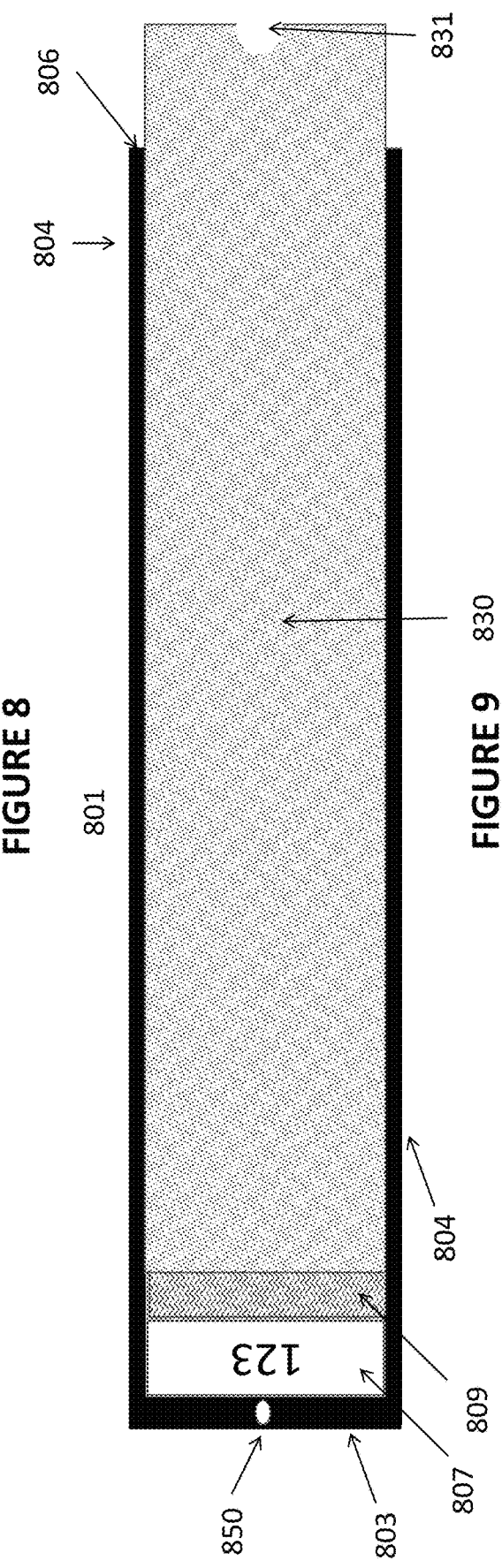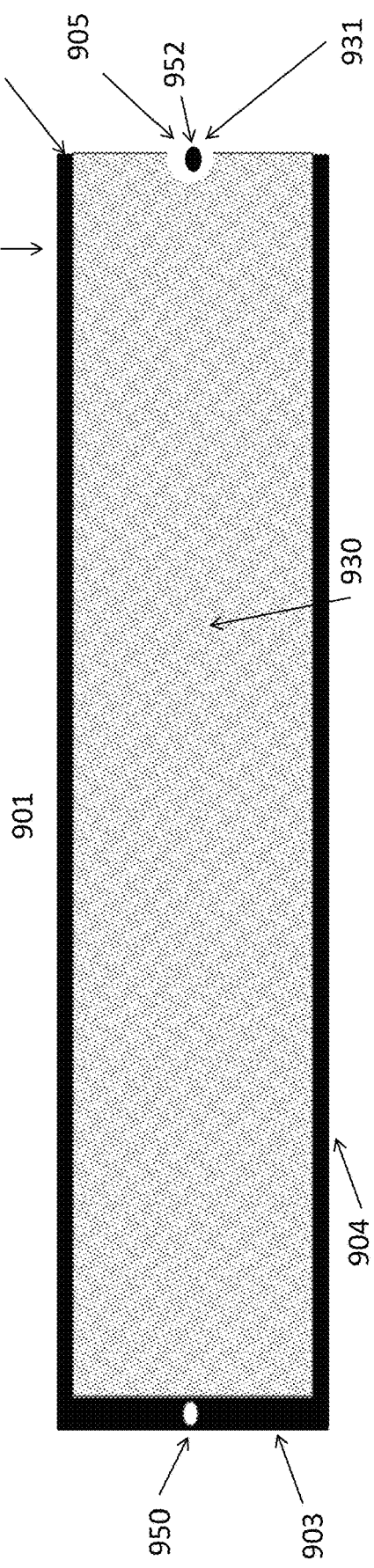

SYSTEM AND METHOD FOR THE INSTALLATION OF GROUND-BASED ADVERTISING UNITS

CROSS-REFERENCE TO RELATED APPLICATION

This application is a continuation in part of U.S. application Ser. No. 15/922,621 filed Mar. 15, 2018, the contents of which are hereby incorporated by reference as if fully recited herein.

TECHNICAL FIELD

Exemplary embodiments of the present invention relate generally to systems and methods for the installation of ground-based advertising.

BACKGROUND AND SUMMARY OF THE INVENTION

One of the most pressing business imperatives today is maximizing the value of a property, be it intellectual, brand-oriented or physical property. Maximizing income is often critical for profitability for a given investment.

Advertising has evolved rapidly with the advent of Internet and mobile devices. In previous generations, advertising was primarily associated with print media, radio, and television, whereas today's advertising executives are constantly looking for ways to reach potential customers via cellular phones, live events (sports, music, etc.), and incessant Internet browsing.

Traditionally, one of the primary ways in companies advertise outside of the digital space is on billboards. These billboards typically reside on the side of a highway or highly trafficked area. The upside to these billboards are that they expose the company's advertisement to many people; however, the quality of exposure is not ideal. A person driving his or her car pays more attention to the cars on the road, the call he or she is on, or the passengers in the car, rather than to the content of the advertisement. Additionally, the driver passes the billboard at a high rate of speed, which makes capturing and reflecting on the advertisement difficult. Finally, given the conditions, most people do not take a photo or somehow capture the data on the advertisement as they drive by, making the billboard advertisements less effective.

An alternative to highway billboard advertising that can reach today's on-the-go consumers is in ground-based environments, such as but not limited to sidewalks, roadways, driveways, patios, bike paths, parking lots, and the like. For example, without limitation, when one parks his or her vehicle in a parking lot, a properly placed advertisement may offer a potential customer a quick look at a nearby product or opportunity, thereby creating a slow intake of the information and an impulse to purchase said product or take advantage of said opportunity. Whereas buses and subways are packed with advertisements, private vehicles generally sport no such advertisements, and are generally difficult to reach. Parking lots offer ideal venues for placing advertisements that drivers will necessarily see as they enter and leave such structures. What is needed is a ground-based advertisement system and method and a system and method for installing the same.

The present invention is a ground-based advertisement system and method and a system and method for installing the same. A plurality of back units may be adapted to be attached to predetermined positions within a parking lot having parking spaces. A plurality of clear covers may be adapted to be placed over each of the back units. The back units and the covers may define substantially sealed cavities adapted to hold one or more advertisements. The advertisements may be adapted to fit within the cavities. The advertisements may include a code, such as but not limited to a QR code, which upon being scanned may retrieve a coupon or further information for use at a nearby retailer. Alternatively, or in addition, the advertisements may include instructions to take a photo of the advertisement and bring it into a nearby retailer for a discount.

An area for installation on the parking lot may be cleaned. A sealant may be applied to the cleaned installation area. A hole may be drilled through the sealed area. Adhesive may be applied to the hole. An anchor may be inserted into the hole. The adhesive may be cured. A fastener may be passed through the advertising unit and into the anchor to secure the advertising unit to the parking lot.

Further features and advantages of the devices and systems disclosed herein, as well as the structure and operation of various aspects of the present disclosure, are described in detail below with reference to the accompanying figures.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein:

FIG. 2A is a top view of an exemplary advertising unit for use with the systems of FIGS. 1A and 1B;

FIG. 2B is a top view of an exemplary cover for the advertising units of FIG. 2A;

FIG. 2C is a top view of an exemplary advertisement for use the advertising units of FIG. 2A;

FIG. 2D is a top view of an exemplary a back unit for the advertising units of FIG. 2A;

FIG. 8 is a top view of another exemplary advertising unit of FIG. 7 with the cover partially inserted;

FIG. 9 is a top view of another exemplary advertising unit of FIG. 7 with the cover fully inserted and shown as non-transparent for purposes of demonstrating the method of insertion;

DETAILED DESCRIPTION OF EXEMPLARY EMBODIMENT(S)

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Embodiments of the invention are described herein with reference to illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Figure 1A:
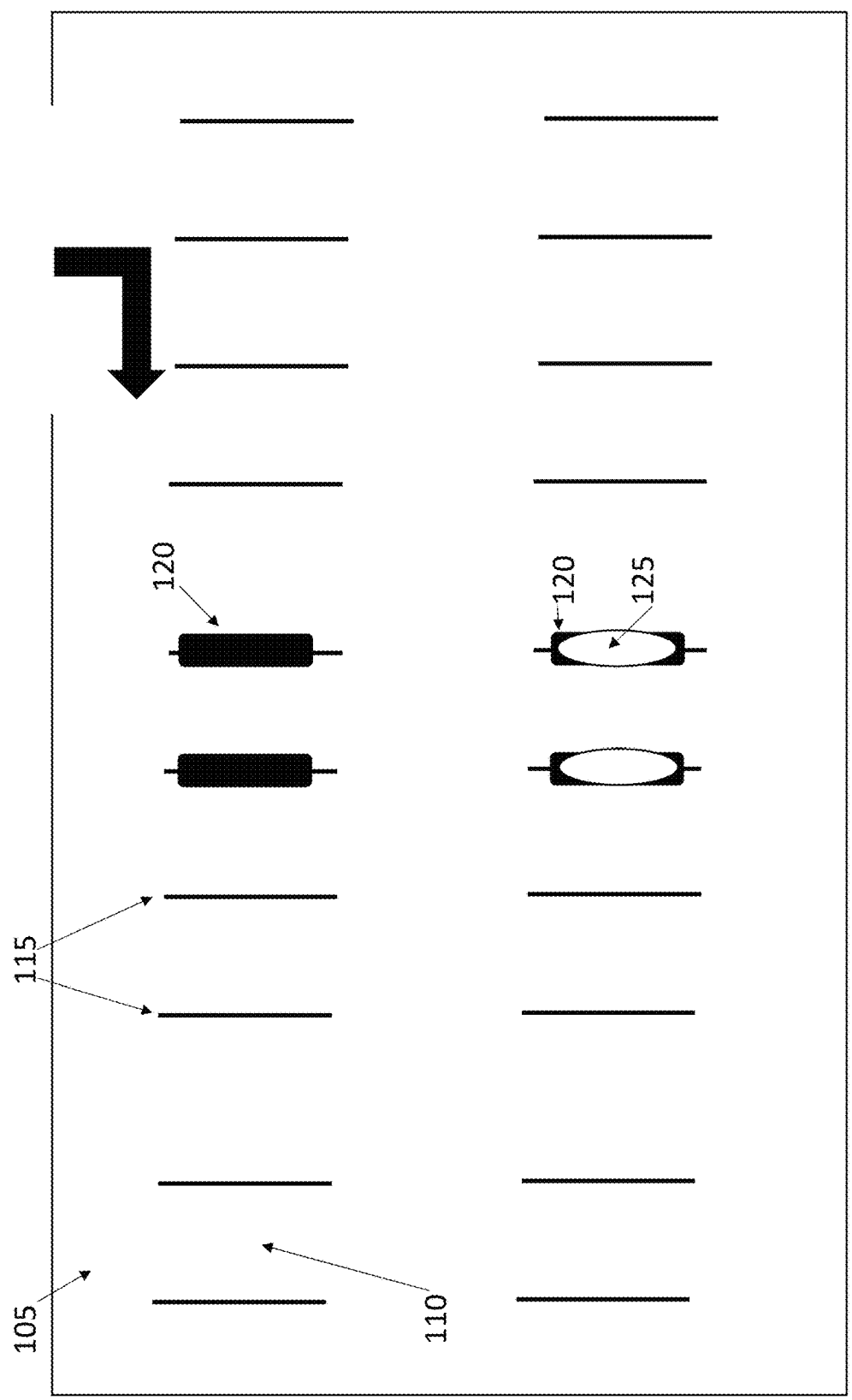
FIG. 1A is top view of an exemplary parking lot advertising system.

FIG. 1A is a top view of an exemplary parking lot advertising system 100. The parking lot advertising system 100 may include a parking lot 105 divided into a plurality of parking spaces 110. Each parking space 110 may be defined by one or more dividers 115. The dividers 115 may generally be realized as white or yellow painted lines or alternatively a raised cement structure. Any kind of divider 115 is contemplated. On such dividers 115, or in their place, back units 120 may be fixed to the surface of the parking lot 105. Fixing of the back units 120 may be accomplished by any means, including but not limited to, bolting, screwing, nailing, fastening, gluing, adhering, attaching, fixing, bonding, immobilizing, some combination thereof, or the like. It is contemplated that the back units 120 may be placed in any pattern or randomly throughout the parking lot 105. In exemplary embodiments, the back units 120 may be spaced such that a vehicle can fit between the back units 120, though such is not required. For example, without limitation, while the back units 120 are illustrated as being located on the dividers 115, it is contemplated that the back units 120 may be placed at the head or foot of a parking space 110.

The covers 125 may be attached to the back units 120. The covers 125 may be comprised of a polymer. The covers 125 may be transparent or translucent. The covers 125 may be waterproof. The back units 120 may be adapted to withstand the weight of a car, truck, bus, or other vehicle either moving over or resting on said back units 120 without cracking, breaking, or undergoing inelastic deformation. Similarly, the covers 125 may be adapted to withstand the weight of a car, truck, bus, or other vehicle either moving over or resting on said covers 125 without cracking, breaking, or undergoing inelastic deformation. The covers 125 may be fastened, attached, joined, combined or otherwise associated transiently or permanently with the back units 120. A hinge may be used to join the back unit 120 and the cover 125. The space between the back unit 120 and the cover 125 may define a cavity adapted to receive advertisements.

In other exemplary embodiments, a portion of the ground, structure surface, or the like may be excavated to form an excavated area for the advertising unit 140. In such embodiments, the excavated area may be sized such that the top surface of the advertising unit 140 is substantially flush with the ground or surface of the structure.

Figure 1B:
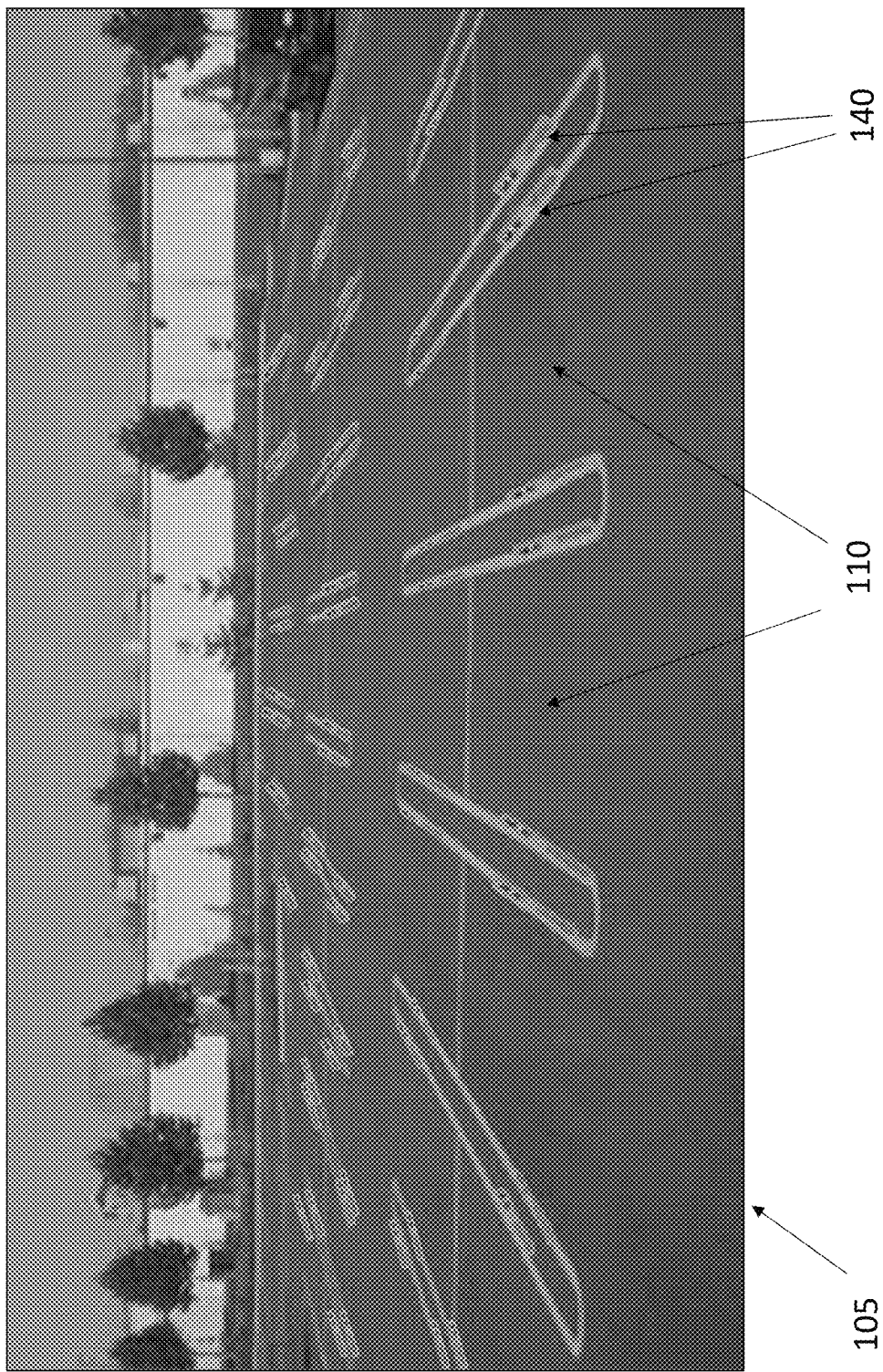
FIG. 1B is a perspective view of another exemplary parking lot advertising system.

FIG. 1B is a perspective view of another exemplary parking lot advertising system. The parking lot 105 may comprise a number of the advertising units 140 placed on the surface of the parking lot 105 around the parking spaces 110. The advertising units 140 may be placed so as to not interfere with facile parking in the parking spaces 110. The advertising units 140 may be adapted to withstand passing and standing vehicles without damage or inelastic deformation. The advertising units 140 may be made from, or contain advertisement made from, reflective or luminescent material that allows the advertisement to glow at nighttime when temporarily exposed to any lighting source. The advertising units 140 may be further configured in size and shape to reduce the risk of tripping over said units.

Attention is turned to FIG. 2A though FIG. 2D which illustrate an exemplary advertising unit 240. A back unit 220 may be attached to the ground, a parking lot 105, or another structure by any means, including but not limited to a fastener, adhesive, bonding technique, or the like. The fastener, adhesive, bonding technique may be configured to maintain a cavity. A cover 225 may be adapted to be placed over the back unit 220. A hinge 227 may connect the cover 225 to the back unit 220 to allow for facile opening and closing of the cover 225 to replace advertisements 235 or otherwise service the advertising unit 240. The back unit 220 and the cover 225 together form the cavity adapted to receive one or more advertisements 235. In exemplary embodiments, the cavity may be substantially sealed. Stated another way, the back unit 220 and the cover 225 may form a substantially sealed engagement such that the cavity is substantially sealed, though such is not required. Regardless, the cavity may form a secure compartment for protecting deposited advertisements 235. The cavity may be configured to withstand severe and extreme weather conditions such as, but not limited to, rain, storms, lightning, wind, hail, snow, freezing conditions, sub-zero temperatures, high temperatures, direct sunlight, tornadoes, earthquakes, flooding, hurricanes, tsunamis, some combination thereof, or the like.

The back unit 220, the cover 225, and other components of the advertising unit 240 may be comprised of a material adapted to withstand the weight of a standing or moving vehicle without being crushed, cracked, or otherwise inelastically deformed. In this way, the advertisement 235 may remain protected within the cavity. Alternatively, or in addition, the back unit 220, the cover 225, and other components of the advertising unit 240 may be configured to resist shear forces. Such shear forces may be experienced as a result of a vehicle moving laterally over the advertising unit 240.

Closing the cover 225 over the back unit 220 with the advertisement 235 in the cavity may constitute a complete advertising unit 240. The back unit 220 may be comprised of any material such as, but not limited to, a metal, rubber, polymer, or the like. The cover 225 may be comprised of any material such as, but not limited to, a polymer.

It is understood that the advertisement 235 may be comprised of any material including but not limited to paper, polymers, metal, and the like. In exemplary embodiments, the advertisement 235 may be printed on a material capable of phosphorescing. The advertisement 235 may comprise colors or be presented in black and white. The advertisement 235 may depict a plurality of advertisements based on optical perspective or may contain a number of advertising images for different retailers. Advertisements 235 may include codes 238, such as but not limited to barcode, QR code, or the like, which may permit a consumer to obtain additional information or discounts for use at a nearby retailer. Alternatively, or additionally, the advertisement 235 may comprise one or more RFID chips 239. The RFID chips 239 may be configured to permit for near range tracking or communication between advertisement 235 and a nearby mobile electronic device.

The cover 225 may be mounted to the back unit 220. In exemplary embodiments, the cover 225 may be mounted to the back unit 220 in a hinged fashion. A polymer-based color advertisement 235 may be placed between the back unit 220 and the cover 225. The advertising unit 240 may further comprise one or more solar energy devices 250 adapted to convert sunlight into energy. The solar energy devices 250 may comprise, for example without limitation, solar panels, photovoltaic cells, and the like. The advertising unit 240 may further comprise a battery 260 in electrical connection with the solar energy device 250. The advertising unit 240 may further comprise one or more illumination devices 280. The illumination devices 280 may be in electrical connection with one or more of the battery 260 and the solar energy device 250. The illumination devices 280 may comprise, without limitation incandescent lights, fluorescent lights, LED lights, some combination thereof, or the like. The illumination devices 280 may be positioned at various location(s) on the back unit 220. The solar energy device 250 and the battery 260 may be adapted to provide electricity to the illumination devices 280 when a sensor 275 identifies low light conditions. While solar energy device 250 are described, alternatively or additionally, a connection to the electrical grid may supply power to the advertising unit 240. Such connection may be wired or wireless.

The advertising unit may further comprise a camera 270 and associated executable software instructions. The camera 270 may be adapted to identify vehicles located in close proximity with the advertising unit 240. The camera 270 may comprise a computing device 285, which may comprise an electronic storage device, a processor, and the like. The executable software instructions may be stored on the electronic storage device and may configure the processor to perform the steps and features shown and described herein.

Figure 2E:
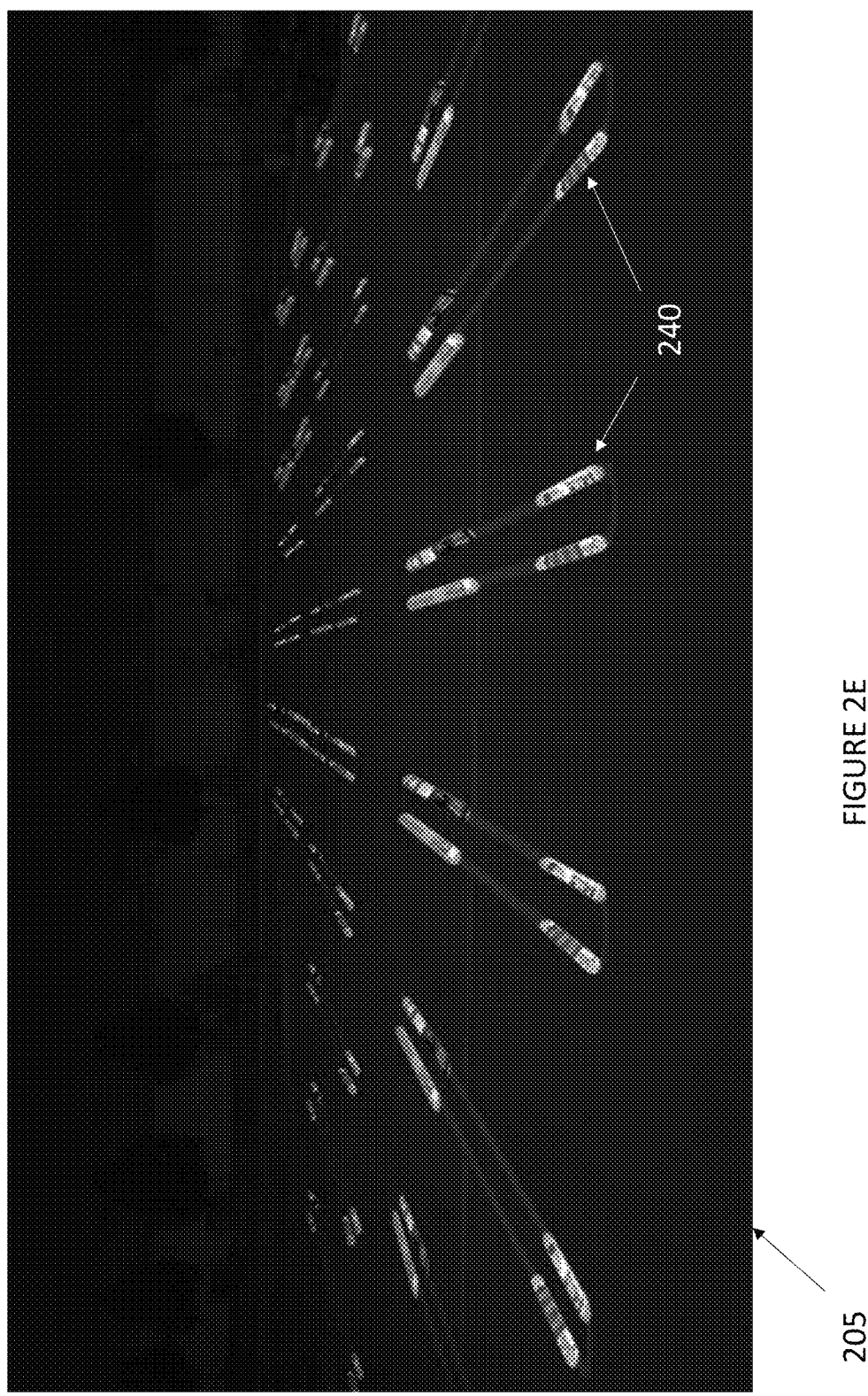
FIG. 2E shows a night view of a parking lot with a plurality of the advertising units of FIG. 2A.

As shown in FIG. 2E, a parking lot 205 may comprise a plurality of advertising units 240 which may be illuminated by the illumination devices 280 by the electrical energy stored it associated batteries 260. Electrical energy may be generated by either grid power or associated solar energy device 250. The light sensors 275 may identify appropriate timing or lighting conditions for activating the illumination devices 280. Alternatively, the timing and lighting controls may be preprogrammed.

Figure 3:
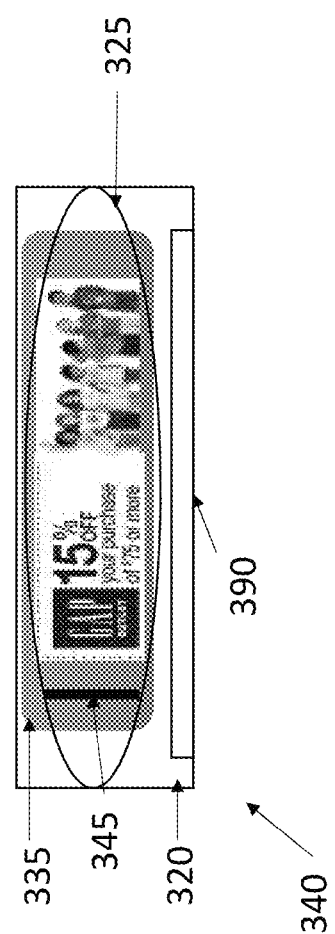
FIG. 3 is a top view of another exemplary advertising unit for use with the systems of FIGS. 1A and 1B.

FIG. 3 illustrates another exemplary advertising unit 340. The advertising unit 340 may additionally comprise a phosphorescent or similar material 390. The material 390 may be configured to illuminate the advertisement 335 deposited within the cavity for a portion of the nighttime. The material 390 may be used in addition to, or in substitution of, the illumination devices 280. The material 390 may be deposited in one, or multiple, locations of the advertising unit 340. The material 390 may comprise, for example, without limitation, a zinc sulfide, strontium aluminate, calcium sulfide, or phosphorescent pigment.

In some exemplary embodiments, the cover 325 may be permanently attached to the back unit 320 to define the cavity for the advertisement 335 or advertisements 335. A slot 345 may be positioned on the cover 325. The slot 345 may be configured to permit the insertion and removal of advertisement 335 as per timing and business arrangement with clients. The slot 345 may comprise a slot cover operable between a closed and an opened position. When the slot cover is in the closed position, in exemplary embodiments without limitation, the cavity may remain substantially sealed.

Figure 4:
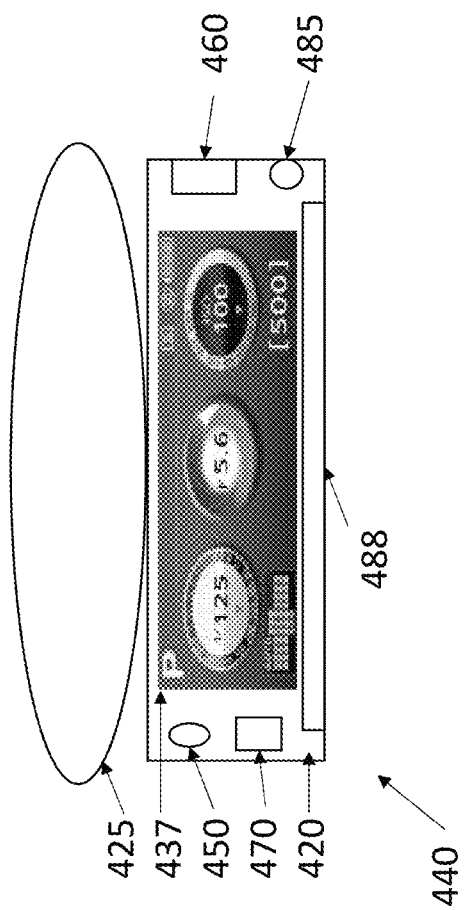
FIG. 4 is a top view of another exemplary advertising unit for use with the systems of FIGS. 1A and 1B.

Attention is turned to FIG. 4 illustrating another exemplary advertising unit 440. The advertising unit 440 may comprise a back unit 420 and a cover 425. The back unit 420 may be configured to be attached to the ground or another surface or structure. For example, without limitation, the back unit 420 may be attached by screws, nails, metal plates, some combination thereof, or the like. The cover 425 may be attached to the back unit 420 in a hinged fashion. The space between the cover 425 and the back unit 420 may define a cavity. An electronic display 437 may be located within the cavity. The electronic display 437 may be adapted to withstand the weight of a vehicle.

The advertising unit 440 may further, alternatively or additionally, comprise a photovoltaic cell 450. The photovoltaic cell 450 may be electrically connected to the electronic display 437. A battery 460 may be electrically connected to the photovoltaic cell 450. The battery 460 may also be electrically connected to the electronic display 437. The photovoltaic cell 450 and the battery 460 may be adapted to supply power to the electronic display 437 such that the electronic display 437 may display images, such as but not limited to, advertising, notifications, or other content.

The images may be delivered to the advertising unit 440 by way of a network connection device 485. The network connection device 485 may be connected to a network, such as but not limited to, a cellular network, the internet, an intranet, the world wide web, or the like. The network device may be powered by a wired electrical connection (not shown) or a wireless electrical connection (not shown). The network connection device 485 may be connected to the network by way of a wired or wireless connection. The advertising unit 440 may further comprise a controller 488. The controller 488 may be a server, database, or the like. The controller 488 may be in electronic communication with the electronic display 437 and the network connection device 485. The controller 488 may comprise executable software instructions, which when executed, configure the control 488 to receive and store advertising content received at the network connection device 485. The software may further configure the controller 488 to direct the electronic display 437 to display particular images. The controller 488 may be configured to select, for example without limitation, the images displayed, the timing of advertisements, and the order of multiple advertisements. For example, without limitation, the controller 488 may be configured to change the displayed image after a predetermined period of time, such as but not limited to, 15 minutes, 30 minutes, 1 hour, 2 hours, 10 hours, 24 hours, one week, two weeks, or one month. Any interval of time is contemplated.

The advertising unit 440 may further comprise a camera 470. The camera 470 may be adapted to identify vehicles located in close proximity to the advertising unit 440. In other exemplary embodiments, the camera 470 may transfer data to the controller 488 which makes such determinations. The controller 488 may be configured to select the images to be displayed on the electronic display 437 based upon the specific car make and model as identified by the camera 470 or the controller 488.

The controller 488 may be located within the cavity. In other exemplary embodiments, the controller 488 is located remote from the advertising unit 440 and is in wireless or wired communication with the advertising unit 440. In still other exemplary embodiments, a single controller 488 may be in communication with multiple advertising units 440. The controller 488 may likewise be in communication with multiple advertising units 440 across multiple parking lots 105.

Figure 5:
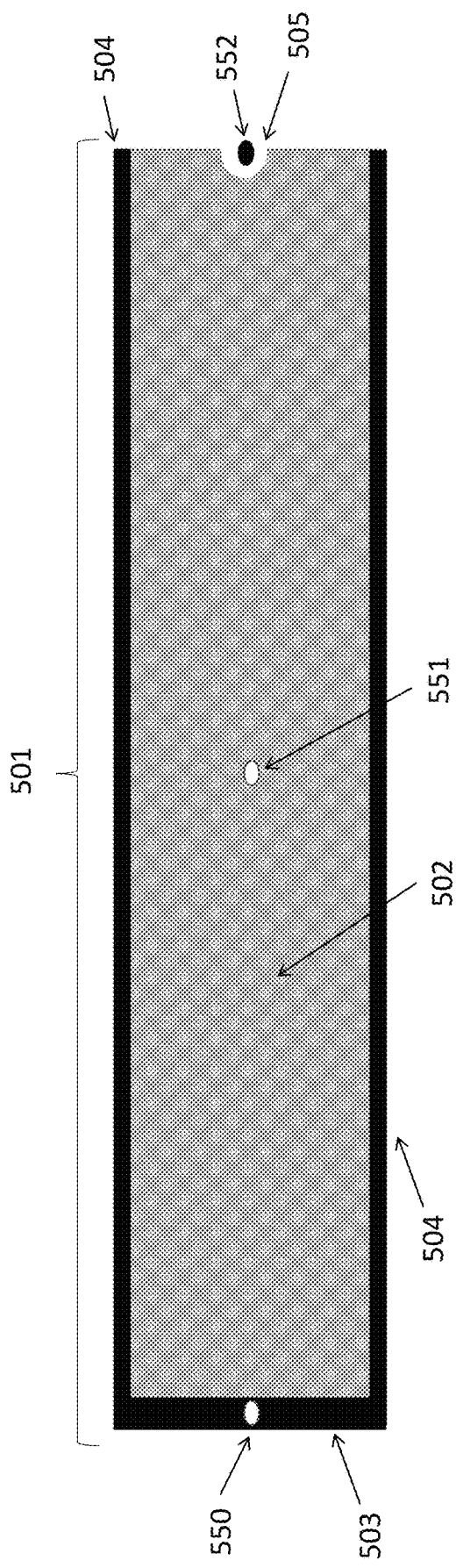
FIG. 5 is a top view of an exemplary back unit of another exemplary advertising unit for use with the systems of FIGS. 1A and 1B.

Attention is turned to FIG. 5 which illustrates another exemplary back unit 501. The back unit 501 may comprise a base 502, a back ridge 503, and one or more side ridges 504. The back ridge 503 may be located along a left side edge of the base 502. The side ridges 504 may extend along the front and rear edges of the base 502. The side ridges 504 and the back ridge 503 may be of similar size such that they may accept a cover in a sliding fashion such that the cover is elevated above the base 502. The space between the cover and the base 502 may define a cavity for accepting one or more advertisements.

The back unit 501 may also comprise a base notch 505 which is configured to accept a front grounding screw 552. The base notch 505 may be semi-circular in shape and may be located along a right side edge of the base 502, though any location is contemplated. In one exemplary embodiment, the back unit 501 further comprises a rear grounding hole 550 and a center grounding hole 551. The rear grounding hole 550 may be located along a left side edge of the base 502 and the center grounding hold 551 may be located in approximately the center of the base 502. The back unit 501 may be attached to the ground via screws inserted through the rear grounding hole 550 and the center grounding hole 551 in addition, or alternatively, to insertion of the front grounding screw 552 in the base notch 505.

The back unit 501 may be substantially rectangular in shape, though any shape is contemplated. The base 502 may be substantially rectangular or oval in shape, though any shape is contemplated.

Figure 6:
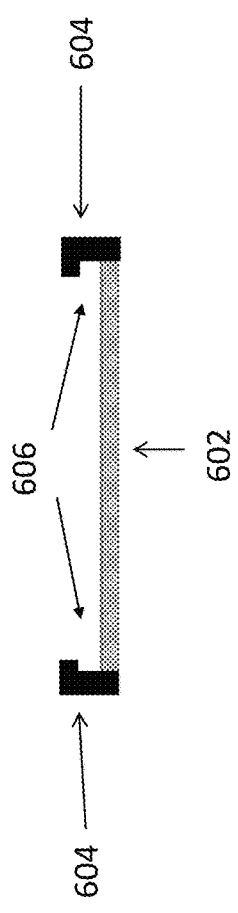
FIG. 6 is a side view top of another exemplary back unit.

Attention is turned to FIG. 6 illustrates a side view of another exemplary back unit. A base 602 and one or more side ridges 604 may form a slide track 606 into which a cover may be easily inserted in a sliding fashion. In exemplary embodiments, the side ridges 504 of FIG. 5 may be similar to the side ridges 604 of FIG. 6.

Figure 7:
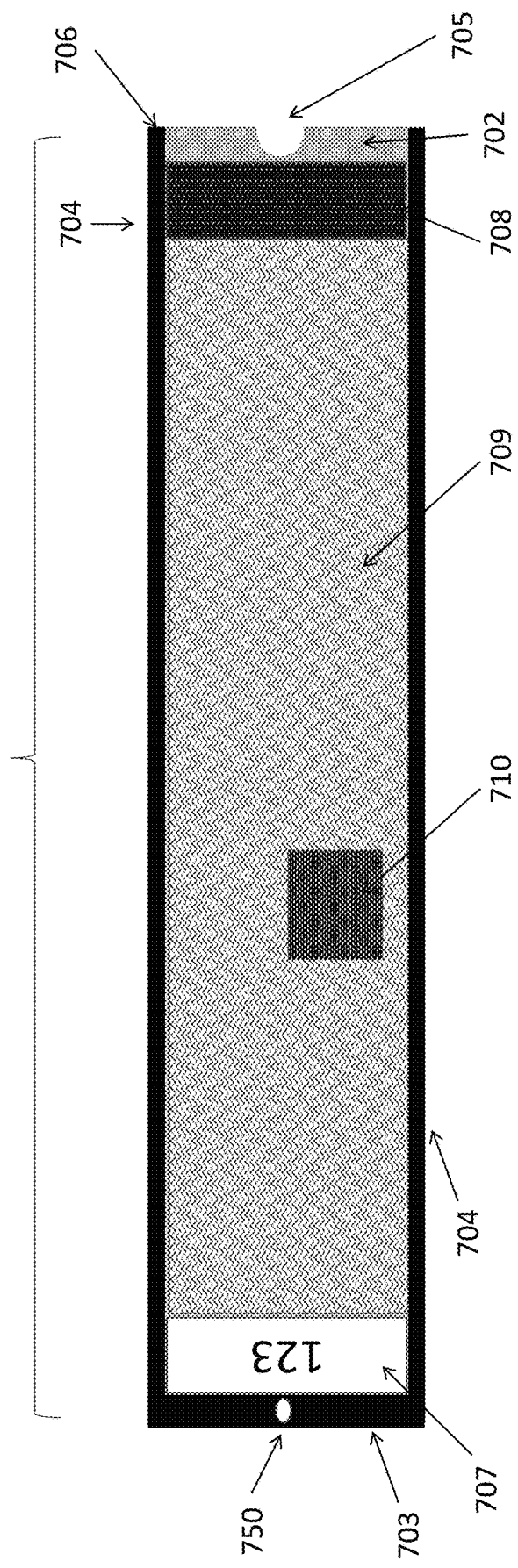
FIG. 7 is a top view top of another exemplary back unit.

Attention is turned to FIG. 7 which illustrates another exemplary back unit 701. The parameters of the base 702 may be defined by a back ridge 703 and one or more side ridges 704. The back ridge 703 and the side ridges 704 may together form a cover slide track 706. A place within the base 702 may be designated for ad space used for optional parking space numbering 707. Additionally, another space may be dedicated as ad space for other smaller advertisements 708. The remainder of the space is the primary advertising space 709. The advertisement placed in the primary advertising space 709 may comprise a QR code 710 or other promotional codes.

Attention is turned to FIG. 8 which illustrates another exemplary back unit 801 with a cover 830 shown partially inserted into track 806. The track 806 may be defined by a back ridge 803, and one or more side ridges 804. In the illustrated embodiment, the cover 830 is shown as non-transparent so as to highlight the method of installation of the cover 830. Attention is drawn to the cover notch 831 which may be identical in size and shape to base notch 705 from FIG. 7. The cover 830 may be comprised of a transparent or translucent material. The cover 830 may be comprise of any material, such as but not limited to a polymer.

Attention is turned to FIG. 9 which illustrates another exemplary back unit 901 with a cover 930 shown fully inserted into a track 906. The track 906 may be defined by a back ridge 903, and one or more side ridges 904. In the illustrated embodiment, the cover 930 is shown as non-transparent so as to highlight the method of installation. Attention is drawn to the alignment of base notch 905 and cover notch 931, which may create a space into which the front grounding screw 952 is inserted. This arrangement may inhibit the tampering or removal of the cover and restricting access to the advertisements contained within the advertising unit.

Figure 10:
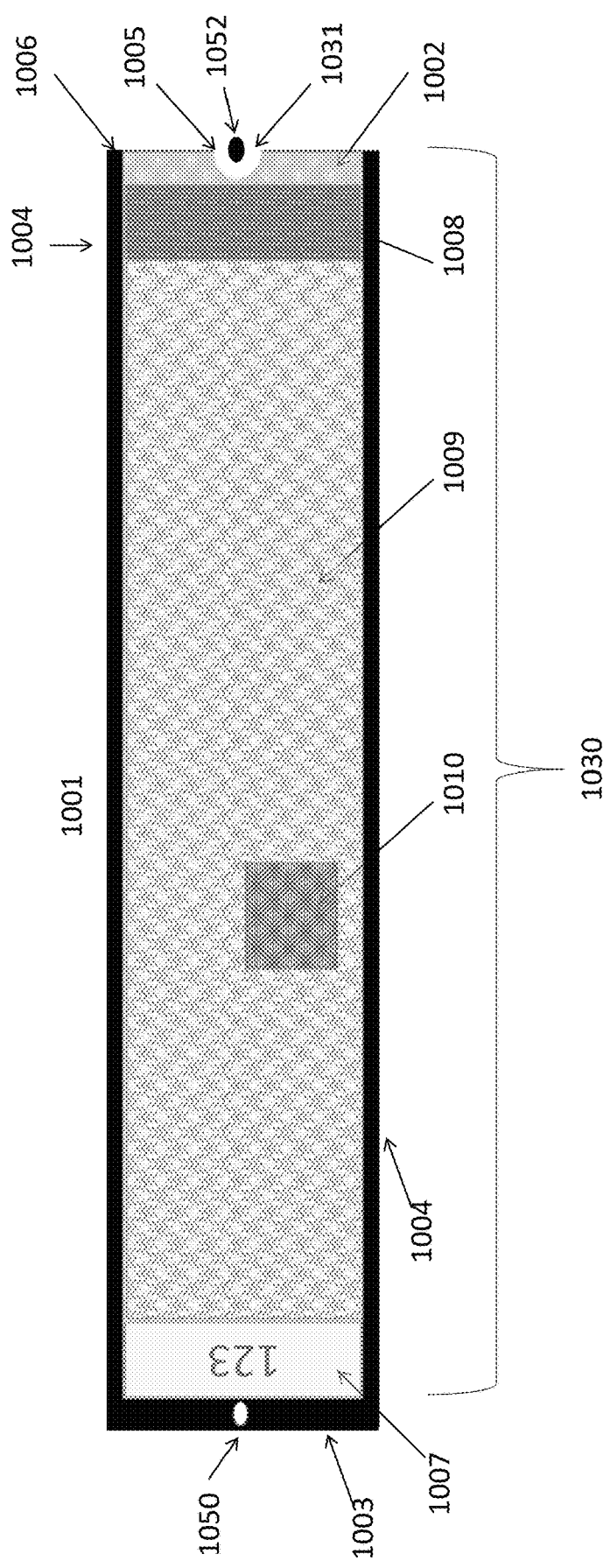
FIG. 10 is a top view of another exemplary advertising unit of FIG. 7 with the cover fully inserted and shown as transparent.

Attention is turned to FIG. 10 which illustrates another exemplary back unit 1001 with a cover 1030 shown fully inserted into track 1006. The tack 1006 may be defined by back ridge 1003, side ridges 1004, and the base 1002. In this figure, the cover 1030 is shown as transparent so as reveal the underlying primary advertising space 1009, the smaller advertising space 1008, and optional parking lot numbering space 1007. Attention is drawn to the alignment of base notch 1005 and cover notch 1031, which may create a space into which the front grounding screw 1052 is inserted.

Figure 11:
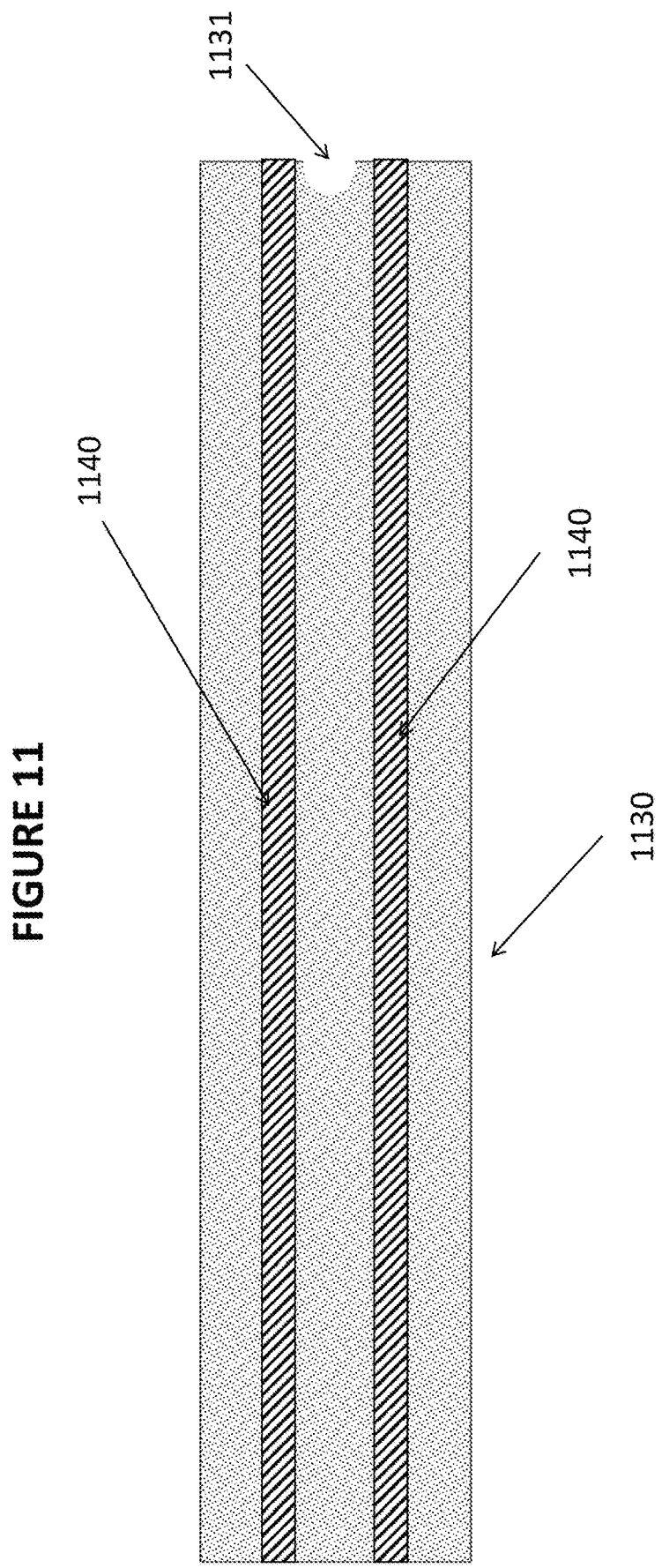
FIG. 11 is a top view of an exemplary a cover, shown in isolation in order to illustrate additional features thereof.

Attention is turned to FIG. 11 which illustrates a cover 1130 with a cover notch 1131 and traction strips 1140 to minimize slips and falls as pedestrians walk over the units. The traction strips 1140 may be comprised of a material having a high coefficient of friction. The traction strips 1140 may be configured to help prevent individuals from slipping when walking over the cover 1130. Any number, size, shape, location, and orientation of the traction strips 1140 is contemplated. For example, without limitation, the traction strips 1140 may comprise a textured surface, be comprised of a tacky material, some combination thereof, of the like.

The advertising units shown and described herein may be installed near a parking space 110, though such is not required. In exemplary embodiments, the advertising unit is installed between adjacent parking spaces 110. The advertising unit may be installed along one or more parking space boundaries 115. The boundaries 115 may comprise pained lines, curbs, dividers, or the like. However, any location of the advertising unit is contemplated.

The advertising units shown and described herein may be sized and configured to have a low profile. In particular, the advertising units may be sized and configured to reduce the chance of tripping over the advertising unit. More specifically, the high of the advertising unit may be configured to extend less than ¼ inch above the surface of the ground, parking lot, or other structure. This may be accomplished by modifying the height of the advertising unit and its various components and/or mounting the advertising unit in a partially or wholly recessed fashion. In particular, the advertising unit may be installed to be flush with the surface of the ground, parking lot, or other structure.

Various components of the advertising units shown and described herein, including but not limited to the back units, the covers, and the like, may be configured to withstand the weight of a vehicle without breaking, cracking, or otherwise inelastically deforming. Alternatively, or in addition, various components of the advertising unit, including but not limited to the back unit, the cover, and the like may be configured to withstand shear forces created by a vehicle contacting the advertising unit or various component thereof without breaking, cracking, or otherwise inelastically deforming.

Figure 12:
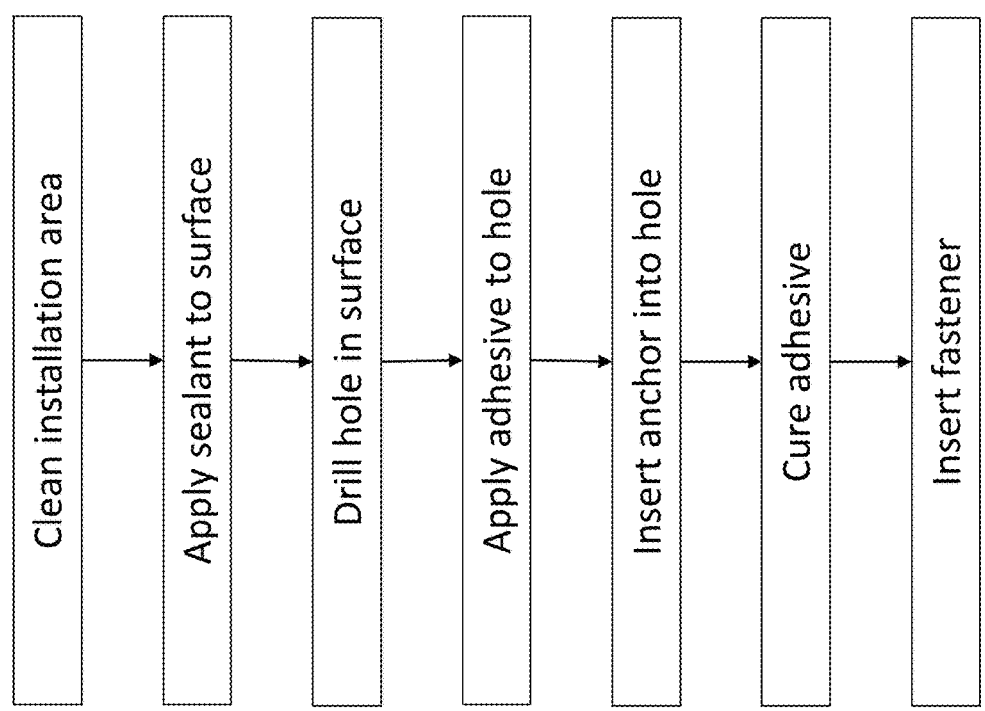
FIG. 12 is a simplified block diagram illustrating an exemplary method for installing the advertising units.

FIG. 12 is a simplified block diagram illustrating an exemplary method for installation the advertising units. An area of the surface where the advertising unit is to be installed may be cleaned. The area may be cleaned by sweeping, vacuuming, washing, power washing, some combination thereof, or the like.

A sealant may be applied to the cleaned area. However, in embodiments where the cleaning step is not required the sealant may be provided to the area of the surface where the advertising unit is to be installed. In exemplary embodiments, the surface may be a parking lot and the sealant may be an asphalt sealant, though any type of surface and any type of sealant is contemplated. In other exemplary embodiments, the sealant may be a tape, such as but not limited to, duct tape.

A hole may be drilled through the area of the surface where the sealant was applied. The use of a sealant may help to prevent cracking or other damage to the surface. However, in other exemplary embodiments, it is not necessary to first apply a sealant and a hole is simply drilled into the area of the surface where the advertising unit is to be installed or the cleaned area.

Adhesive may be applied to the hole, for example without limitation, by depositing the adhesive within the hole. The adhesive may be a glue, an epoxy, some combination thereof, of the like. Any type of adhesive is contemplated.

An anchor may be inserted into the hole. The anchor may be configured to mate with a fastener. For example, without limitation, the anchor may comprise threads configured to mate with the threads of the fastener. The anchor may be a threaded anchor, expansion anchor, hollow wall anchor, wall plug anchor, toggle bolt, winged anchor, spring anchor, sleeve anchor, some combination thereof, or the like. Any type of anchor is contemplated.

The adhesive may be cured. Curing of the adhesive may be performed by waiting a period of time, exposing the adhesive to air, forcing air over the adhesive, applying heat, applying cool, applying a catalyst, some combination thereof, or the like. Any method or devices for curing the adhesive are contemplated.

A fastener may be passed through the advertising unit and into the anchor. For example, without limitation, the fastener may be passed through the center grounding hole 551 into the anchor located in the drilled hole. This process may be repeated such that the advertising unit may be secured with any number of fasteners to any number of anchors in any number of drilled holes in the surface. The advertising unit may comprise any number of corresponding apertures for securing the advertising unit to the surface.

All steps shown and described herein are optional, may be performed in any order, and may be repeated any number of times. The fasteners shown and described herein may be of any type. For example, the fasteners may be screws, anchors, nails, bolts, some combination thereof, or the like. The fasteners may comprise one or more tamper-resistant features such as a unique head design.

Any embodiment of the present invention may include any of the features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

What is claimed is:

1. A method for installing a ground-based advertising unit comprising the steps of:
   providing a ground-based advertising unit comprising an aperture for accepting a fastener;
   drilling a hole into a surface;
   applying an adhesive to the hole;
   inserting an anchor into the hole, wherein the anchor is configured to mate with the fastener;
   curing the adhesive;
   inserting the fastener through the aperture;
   mating the fastener with the anchor; and
   applying a sealant to the surface, wherein the hole is drilled into the area where the sealant is applied;
   wherein the surface is a parking lot and the sealant is an asphalt sealant or duct tape.

2. The method of claim 1 further comprising the steps of:
   cleaning the installation area.

3. The method of claim 2 wherein:
   the step of cleaning the installation area comprises sweeping the installation area.

4. The method of claim 1 wherein:
   the step of applying an adhesive comprises depositing the adhesive into the hole.

5. The method of claim 1 wherein:
   the provided ground-based advertising unit comprises:
   a cover;
   a back unit comprising:
     a base,
     a back ridge attached to the base,
     two side ridges attached to the base, and
     an aperture configured to receive the fastener; and
   a track defined by the back ridge and two side ridges, wherein the track is configured to support the cover in an elevated position, and wherein the track is further configured to support the cover is a sliding arrangement.

6. The method of claim 1 wherein:
   the fastener is a screw; and
   the anchor comprises threads configured to mate with the fastener.

7. The method of claim 6 wherein:
   the anchor is an expansion anchor.

8. The method of claim 1 wherein:
   the adhesive is a glue.

9. The method of claim 1 further comprising the steps of:
   drilling a second hole into the surface;
   applying a second portion of the adhesive to the second hole;
   inserting a second anchor into the second hole, wherein the second anchor is of the same type as the anchor and is configured to mate with a second fastener of the same type as the fastener;
   curing the second portion of the adhesive;
   inserting the second fastener through a second aperture in the ground-based advertising unit; and
   mating the second fastener with the second anchor.

10. The method of claim 1 wherein:
    the step of curing the adhesive comprises waiting a period of time.

11. A method for installing a ground-based advertising unit to a surface of a parking lot comprising the steps of:
    providing a ground-based advertising unit comprising an aperture for accepting a fastener for mounting the advertising unit to the surface of the parking lot;
    cleaning an installation area located on the surface of the parking lot;

applying a sealant at the cleaned installation area;
drilling a hole through the sealant and into the parking lot;
depositing an adhesive into the hole;
inserting an anchor into the hole such that the anchor is secured to the hole by way of the adhesive, wherein the anchor is configured to mate with the fastener;
inserting the fastener through the aperture; and
mating the fastener with the anchor;
wherein the ground-based advertising unit comprises a back unit, a cover, and a track configured to receive the cover in a sliding arrangement, wherein the space between the back unit and the cover defines a cavity configured to received on or more advertisements.

12. The method of claim 11 wherein:
the fastener is a screw;
the anchor is an expansion anchor;
the step of cleaning the installation area comprises sweeping; and
the sealant is an asphalt sealant.

13. A system for installing a ground-based advertising unit to a surface comprising:
an anchor configured to be placed within a hole in the surface;
a fastener configured to mate with the anchor;
an adhesive configured to secure the anchor to the hole in the surface;
a cover;
a back unit comprising:
a base,
a back ridge attached to the base,
two side ridges attached to the base, and
an aperture configured to receive the fastener; and
a track defined by the back ridge and two side ridges, wherein the track is configured to support the cover in an elevated position, wherein the track is further configured to support the cover in a sliding arrangement;
wherein the cover and the back unit is adapted to withstand the weight of a vehicle without experiencing inelastic deformation.

14. The system of claim 13 wherein:
the surface is a parking lot; and
the fastener is a screw.

15. The system of claim 13 further comprising:
a sealant configured to be placed at the hole in the surface of the parking lot and beneath the back unit, wherein said sealant is an asphalt sealant.

* * * * *